United States Patent [19]

Montreuil et al.

[11] Patent Number: 5,667,306

[45] Date of Patent: Sep. 16, 1997

[54] NUMERICAL TEMPERATURE READING APPARATUS FOR SPA, SWIMMING POOL AND WHIRLPOOL

[76] Inventors: Richard Montreuil, 3399, Rue Beauchamps, Ste-Foy, (Quebec), Canada, G1X 2C8; Jean-Denis DuBois, 1065, Rue François-Lemire, Cap-Rouge, (Quebec), Canada, G1Y 1A9

[21] Appl. No.: 429,558

[22] Filed: Apr. 27, 1995

[51] Int. Cl.$^6$ ............................................. G01K 1/00
[52] U.S. Cl. ................................. 374/208; 374/141
[58] Field of Search ............................ 374/147, 148, 374/170, 208, 141

[56] References Cited

U.S. PATENT DOCUMENTS

| | | | |
|---|---|---|---|
| 1,653,213 | 12/1927 | Kates | 374/148 |
| 1,828,170 | 10/1931 | Bristol | 374/148 |
| 3,526,134 | 9/1970 | Schaus | 374/148 |
| 4,138,890 | 2/1979 | Brown | 374/148 |
| 4,435,095 | 3/1984 | Jones et al. | 374/208 |
| 4,738,549 | 4/1988 | Plimpton | 374/208 |
| 4,830,515 | 5/1989 | Cortes | 374/208 |
| 4,904,091 | 2/1990 | Ward | 374/208 |
| 5,100,245 | 3/1992 | Glennon et al. | 374/148 |
| 5,139,345 | 8/1992 | Schäfer et al. | 374/208 |
| 5,149,198 | 9/1992 | Sterzer | 374/208 |
| 5,199,790 | 4/1993 | Pawelzik et al. | 374/208 |
| 5,229,065 | 7/1993 | Bourgeon et al. | 374/208 |

FOREIGN PATENT DOCUMENTS

| | | | |
|---|---|---|---|
| 2532750 | 3/1984 | France | 374/208 |
| 3-185321 | 8/1991 | Japan | 374/141 |
| 3-179227 | 8/1991 | Japan | 374/141 |
| 1334550 | 10/1973 | United Kingdom | 374/208 |

*Primary Examiner*—G. Bradley Bennett

[57] ABSTRACT

The present invention relates to a digital water temperature reading device for a spa, swimming pool and whirlpool. A temperature probe is located inside an adaptor screwed in one of the waste openings of a filtration or pumping system. The adaptor fills in a double function, to serve as receptacle for the temperature probe and to replace the waste plug otherwise located in the opening. The adaptor includes a dome receiving a contact point of the temperature probe in its concave part and getting in touch with the bath water in its convex part. The dome is surrounded by a circulation channel facilitating the heat transfer between the water and the contact point. The temperature probe is maintained in place by means of a plug equipped with a slot to engage a wire connected to the temperature probe and connected, by a wire or an emitter, to a digital monitor. The slot could be self-sealing.

11 Claims, 9 Drawing Sheets

NUMERICAL TEMPERATURE READING APPARATUS FOR SPA, SWIMMING POOL AND WHIRLPOOL

BACKGROUND-FIELD OF INVENTION

This invention belongs to the field of continuous digital reading of water temperature, specifically to apparatus reading at a distance water temperature in a filtration or pumping system of a spa, swimming pool or whirlpool.

The present problem is that available means for measuring the temperature are not adapted to read at a distance and in continuity from a digital reader. Some probes are directly utilized in the liquid and are eventually affected by corrosion. Other probes are located in some places where a flowing liquid does not circulate, consequently these probes do not procure a temperature reading of a system, but only a temperature reading within a precise place where a liquid may stagnate in a system and do not accurately read changes in temperature, giving a wrong reading. Other probes are using a protective envelope with inadequate heat transfer. A need does exist for reliable reading of water temperature of a spa, a swimming pool or a whirlpool. This is now possible with an adapter installed at one of several suitable places, like small diameter pipes of filtering or pumping equipment already in place.

BACKGROUND- DESCRIPTION OF PRIOR ART

A review of the Prior Art has revealed a number of patents relating to measuring elements: temperature probe, thermocouple, thermometer and thermistor.

The following patents were found of interest.

U.S. Pat. No. 5,139,345 Schäfer et al., 18 Aug. 1992, shows a thermometer located in the interior of a receptacle passing through the wall of a kneading machine; the receptacle is equipped with a high thermal conductivity tip. The receptacle installation necessitates the puncture of a hole through the kneading machine wall. Moreover, the receptacle does not seem removable and cannot be adapted in another position on the kneading machine.

U.S. Pat. No. 4,904,091 Ward, 27 Feb. 1990, illustrates a thermocouple which takes temperature readings inside a material. The thermocouple is located in the interior of a screw and within grooves located inside the material: the screw and the material have similar thermal properties. The Ward invention does not seem to be modular, since the thermocouple is covered at its exit by an epoxy based resin.

U.S. Pat. No. 4,830,515 Cortes, 16 May 1989, shows a fastener comprising a number of connections screwed to position a thermocouple tip. This invention comprises an assembly of pieces that is relatively complex.

U.S. Pat. No. 4,435,095 Jones et al., 6 Mar. 1984, shows a thermometer to measure the water temperature in a spa or pool. Jones' does not allow temperature readings from a distance nor continuously.

GB 1334550, Oct. 1973, shows a probe inserted in a jacket and an adapter. The adapter comprises a probe coming into contact with a jacket with the help of pressure exerted by a spring located inside the jacket. This system has the disadvantage of creating a twisting effect into the transmission cable when the jacket is unscrewed from the adapter.

JP 3-179227A Masahito Nagayama, 5 Aug. 1991, shows a thermistor equipped with a float and conceived for hot water temperature control. The thermosensitive element is covered by a synthetic resin membrane.

JP 403185320 A Okazaki Seisakusho, Aug. 1991, shows a temperature sensor of high resolution conceived to be used in extreme conditions such as high temperature, quick changes of temperature and mechanical shocks.

FR 2532-750-A Usines Renault, 9 Mar. 1983, shows a temperature probe comprising a socket with grooves and a locking element of a stirrup shape comprising means for anchoring with an opening used by the probe to pass through. The invention is conceived to be rapidly set onto foundry equipment.

A number of remote temperature monitoring systems are patented for a number of applications, like the temperature reader inside a vehicle motor, foundry furnace, hot water piping, etc. These apparatuses are not made to receive a temperature probe and replace a draining plug located on a filtration or pumping system of a spa, a pool or a whirlpool. My digital temperature reading apparatus for spa or pool is to comprise a temperature probe installed inside the pumping or filtration system.

OBJECTS AND ADVANTAGES

The first objective of the present invention is to provide means for remote digital temperature measures which allow continuous reading of the real circulating water temperature in a spa, pool or whirlpool.

A more precise objective is to provide a combination of a temperature probe comprising a wire or an emitter, an adapter that can be screwed in the place of a drain plug and provided with a dome to receive a temperature probe, a cap adapted to hold in place the temperature probe and to insure that the probe will be in contact with the dome, a slit located on the cap and adapted to allow insertion of the temperature probe wire and a digital temperature reader attached to the temperature probe wire or to a receiver.

Another objective is to provide an <<easy-to-install>> device for a liquid temperature probe, the temperature probe comprising a contact point, an enveloping body and means for transmitting data, the device comprising an elongated hollow body of a generally cylindrical shape defining an adapter with a closed end, an open end and a central part, the closed end comprising a dome and a male threading, the dome receiving the contact point in its concave part and coming in contact with the liquid with its convex part.

The dome is to be surrounded by a circular channel, for liquid circulation to facilitate heat transfer from the liquid to the contact point. The male threading is for fixing the closed end of an adapter to a filter system.

The open end comprises also a male threading to receive a cap adapted to push against the enveloping body so the contact point rests against the dome. The pushing, cap comprises a slit on all its length to let a data transmitting wire pass through.

The central part is hollow to receive the temperature probe and hold three rigid supports placed at 120° of one another to avoid that the temperature probe overly strain the dome.

BRIEF DESCRIPTION OF THE DRAWINGS

We will describe in a more detailed manner a system true to the present invention in reference to the annexed drawings and where it should not be construed as limiting the scope of the invention but as merely providing illustrations of some of the presently preferred embodiments of this invention. In the drawings, closely related figures have the same numbers but different alphabetical suffixes and parts are numbered sequentially and have the same number as in the parts list provided.

DESCRIPTION OF THE INVENTION

Figure 1:
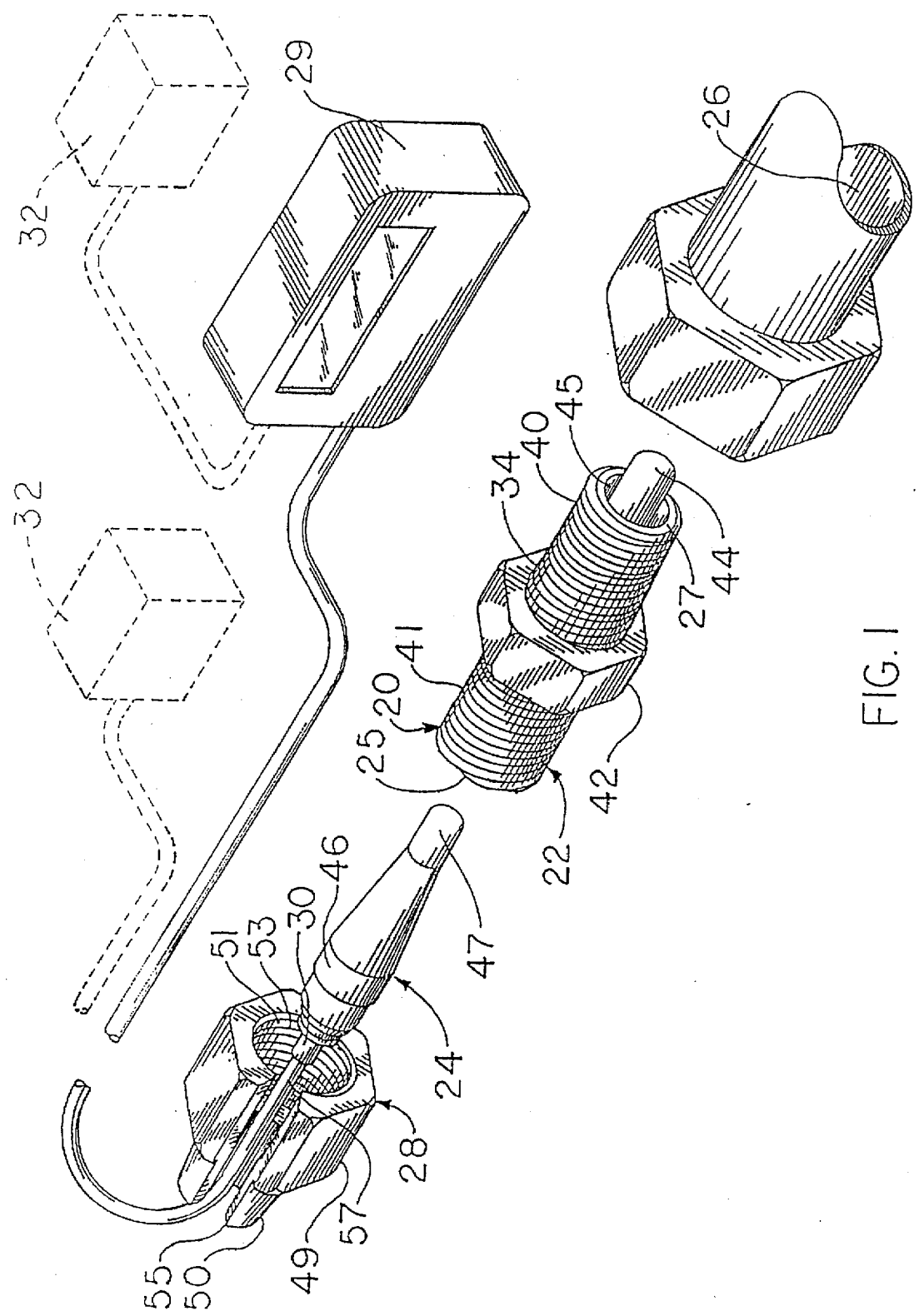
FIG.1 is a perspective view of the device.

The preferred embodiment of the invention is illustrated in FIG.1 where the same characterizing elements are identified by the same numbers and where one sees:

a digital reading apparatus 20 conceived to obtain numerical and continuous readings at a distance of the water temperature of a spa, a swimming pool or a whirlpool. The reading apparatus 20 comprises four main pieces:

1) an adapter 22, the adapter 22 comprising a closed end 27 for fixing into an opening of a drain 26, and an open end 25, 2) a temperature probe 24 to fit into the open end 25, 3) a cap 28 adapted to protect and hold in place the temperature probe 24 and 4) a digital reader 29 linked to the temperature probe 24 by a wire 30 or an emitter-receptor system 32.

The adapter 22 is of a generally cylindrical shape and comprises a central part 34, an open end 25 and a closed end 27. The central part 34 comprises a male thread 40 and is inserted in a nut 42. The nut 42 is located towards the center of the central body 34, in reference to a longitudinal axis. The closed end 27 comprises a dome 44, an annular appendix 63 located around the dome 44 a certain distance away from the dome 44, thereby defining a circulation channel 45 located around the dome 44.

The temperature probe 24 is of a generally conical shape and comprises an enveloping body 46, a contact point 47 at a pointed extremity and a transmission wire 30 at the other extremity.

The cap 28 comprises, on one side of an imaginary disk perpendicular to a central longitudinal axis, a hexagonal open body 49 and, on the other side, a cylindrical appendix 50 located end to end with the hexagonal open body 49, on the same longitudinal axis The hexagonal open body 49 has a large diameter 51 and a female cap thread 53 which joins the male thread for capping 41 at the open end 25 and permits to adjust the pushing of the enveloping body 46 and therefore the contact point 47 against the interior of the dome 44. The cylindrical extension comprises a small ring 55 to receive the transmission wire 30. The cap 28 also comprises a radial slit 57 originating from the longitudinal axis and proceeding all along the length of the cap 28. The slit 57 allows the insertion of the transmission wire 30 and may be made of an auto-sealing nature. The transmission wire 30 of the temperature probe 24 is attached to the numerical reader 29 or to the emitter-receptor system 32. The cap 28 completes the envelope at the end of the probe to protect the probe itself against shocks and to prevent the probe to be pulled accidentally.

Figure 2:
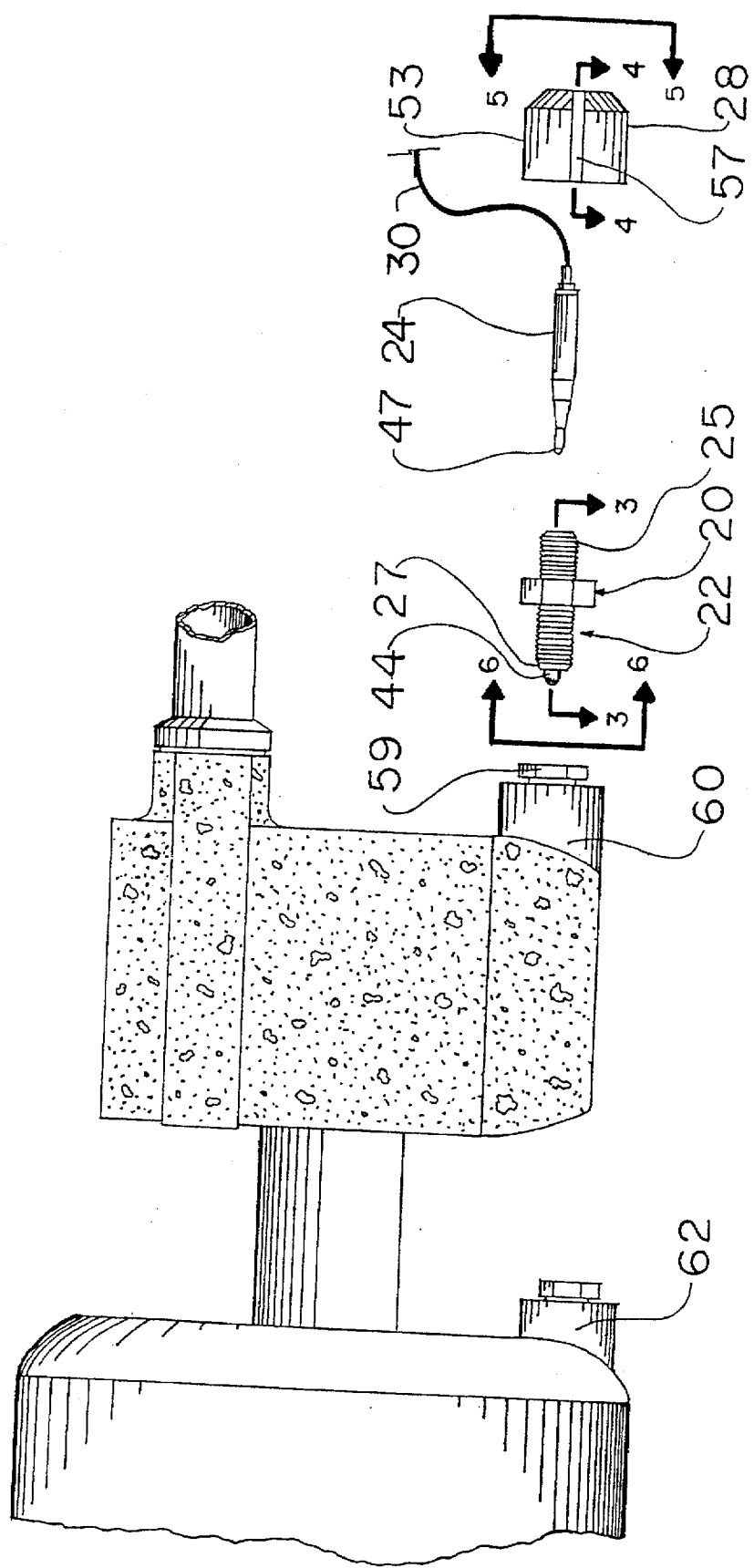
FIG.2 is a side view of the device.

FIG.2 shows in details the installation of a digital reading apparatus 20. The closed end 27 of the adapter 22 is screwed in the place of a drain plug 59. The temperature probe 24 is then inserted inside the adapter 22 through the open end 25 until its contact point 47 touches the interior of the dome 44. The hexagonal open body 49 of the cap 28 is screwed onto the open end 25 of the adapter 22. The cap 28, when turned for tightening, holds the contact point 47 against the dome 44. The transmission wire 30 is inserted in the cap 28 through a slit 57 to allow the transmission wire to be placed axially in the center of the cap without impeding the screwing of the cap. The adapter 22 may be installed in the place of the drain plug 59 localized at a filter drain exit 60 or at a pump drain exit 62.

Figure 3A:
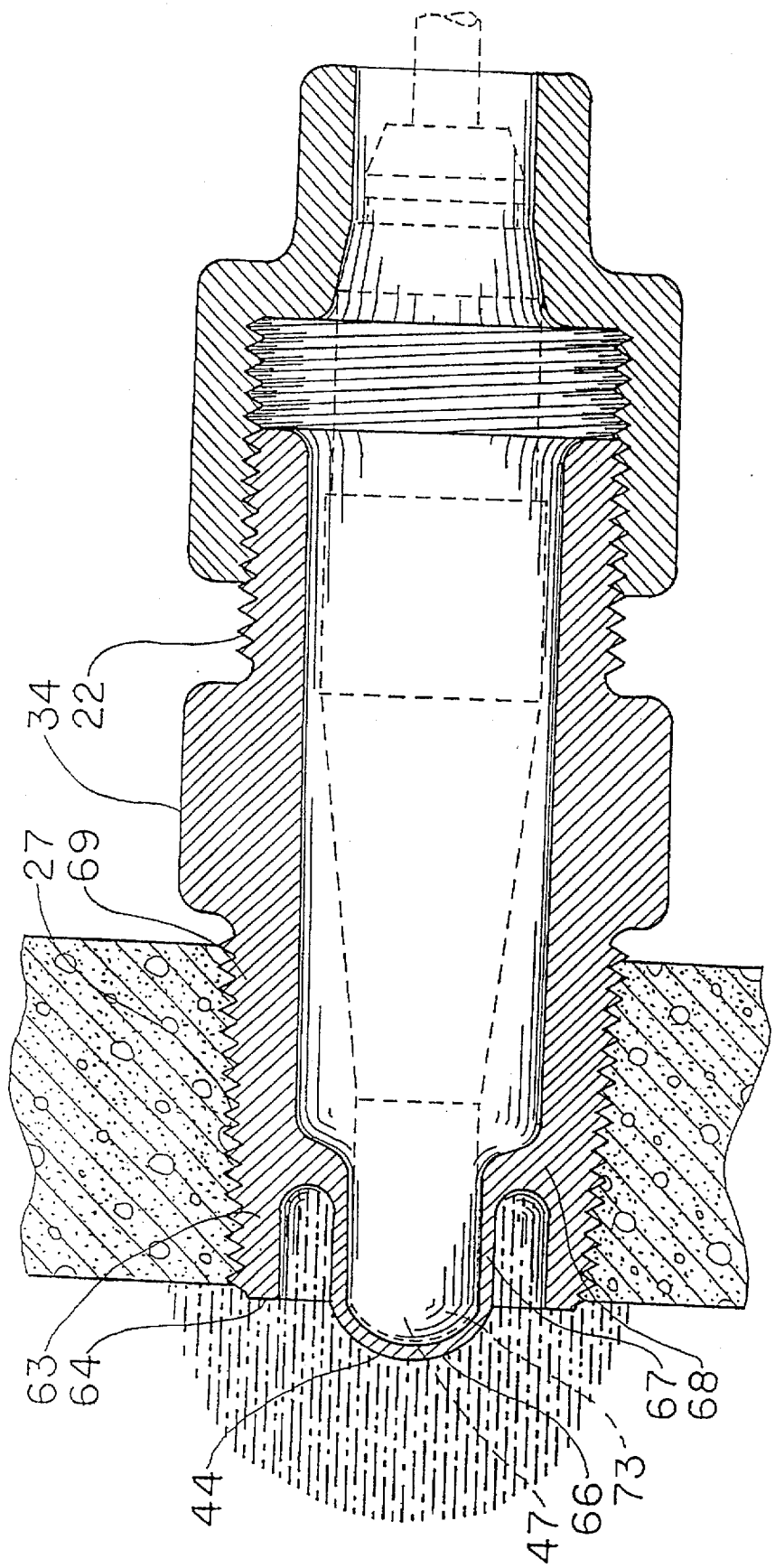
FIG.3A is a cut according to line 3—3 of FIG.2.

FIG.3A shows in details the circulation channel 45 located on the closed end 27 and comprises a restriction area 68 and an annular appendix 63. The annular appendix 63 originates from the restriction area 68 and continues up to the extremity 64 concentrically located and to the exterior of the dome 44. The dome 44 comprises a hemispherical end 66 placed on an annular extension 67 also originating from the restriction area 68 but within the interior area of the annular appendix 63, the diameter of the dome 44 being much smaller than that of the annular appendix 63. The space between the extremity 64, the annular extension 67 and the restriction area 68 defines the circulation channel 45. The circulation channel 45 is improving the contact surface around the dome 44 to permit a better heat transfer, thanks to the water turbulence, between the contact point 47, the dome 44 and the water present in the filtering and pumping system of a spa, a swimming pool or a whirlpool.

Three supports 69 at 120° of each other are located in the central part 34 and disposed on a slope from the restriction area 68 in a way to prevent the point of contact 47 to deform or pull in the dome 44.

Figure 4:
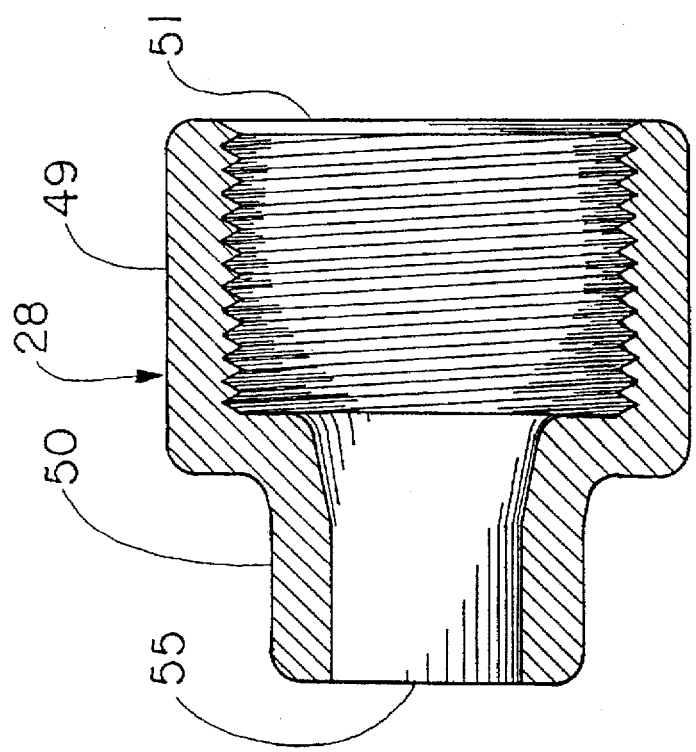
FIG.4 is a cut according to line 4—4 of FIG.2.

FIG.4 shows a detail cut of the cap 28 comprising a hexagonal open body 49 and a cylindrical appendix 50, the large diameter 51 of the hexagonal open body 49 placed end to end with the small ring 55 of the cylindrical appendix 50.

Figure 5:
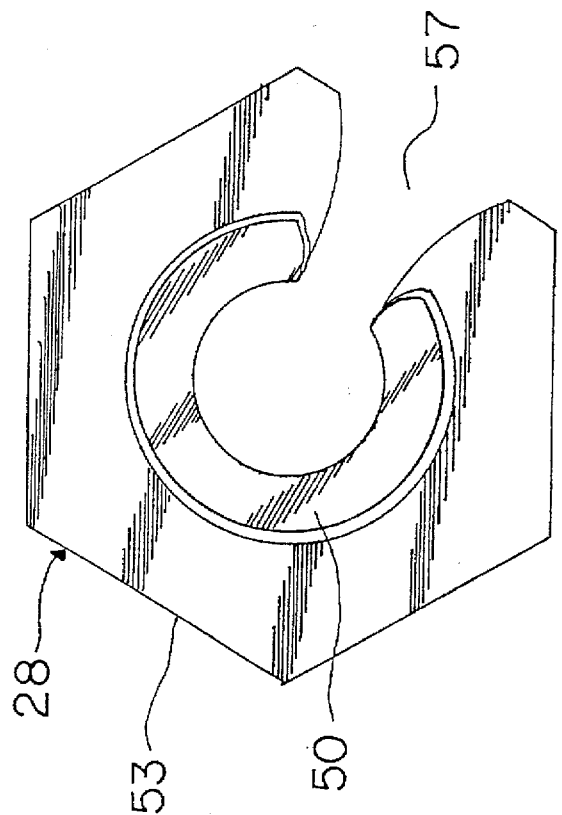
FIG.5 is an end view according to line 5—5 of FIG.2.

FIG.5 shows a view of an end of a cap 28 comprising the hexagonal open body 49, the cylindrical appendix 50 and the slit 57.

Figure 6:
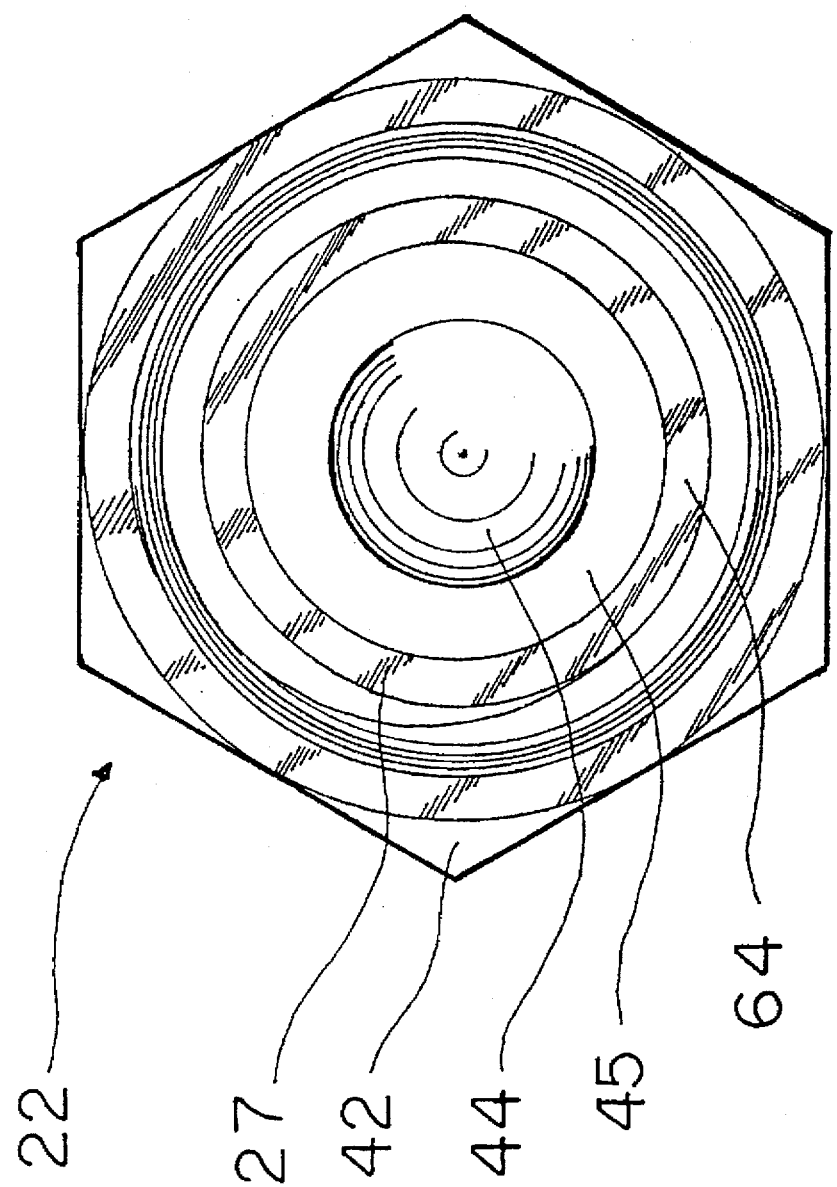
FIG.6 is an alternative end view according to line 6—6 of FIG.2.

FIG.6 illustrates in detail the closed end 27 of the adapter 22 with, on the same longitudinal axis, the hexagonal shape nut 42, the extremity 64, the circulation channel 45 and the dome 44.

Figure 7:
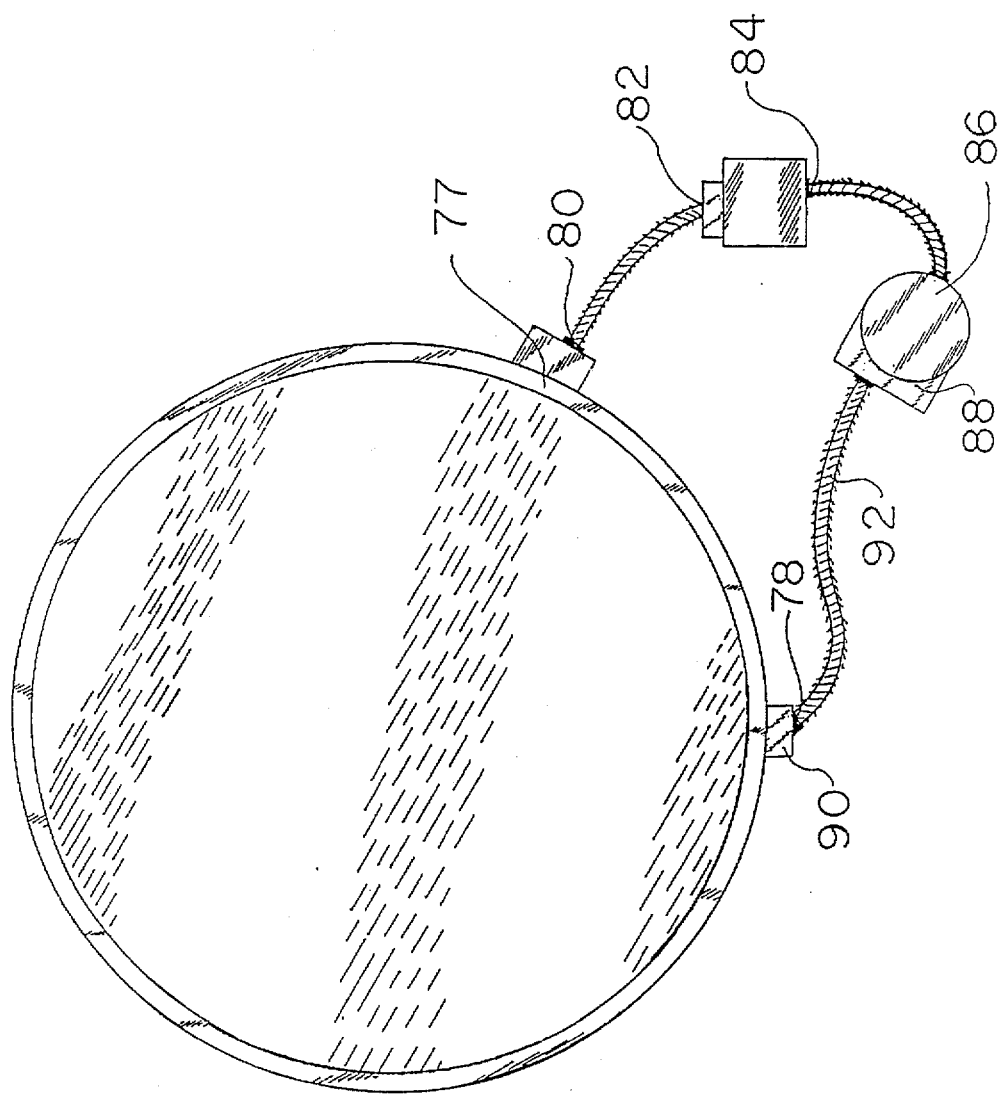
FIG.7 is a localization diagram for filter joints.

FIG.7 illustrates different possible installation locations around a swimming pool 77 namely in a fitting joint usually fixed or threaded in a filtering or pumping system of a swimming pool 77: the fitting joint 78 is especially molded and comprises an opening; the fitting joint 78, which replaces an existing fitting joint, may be located at an exit of a skimmer 80, at an entrance of a strainer 82, at an exit of a pump 84, at an entrance of a filter 86, at an exit of a filter 88, at a water return 90, or on small diameter pipes.

Figure 8B:
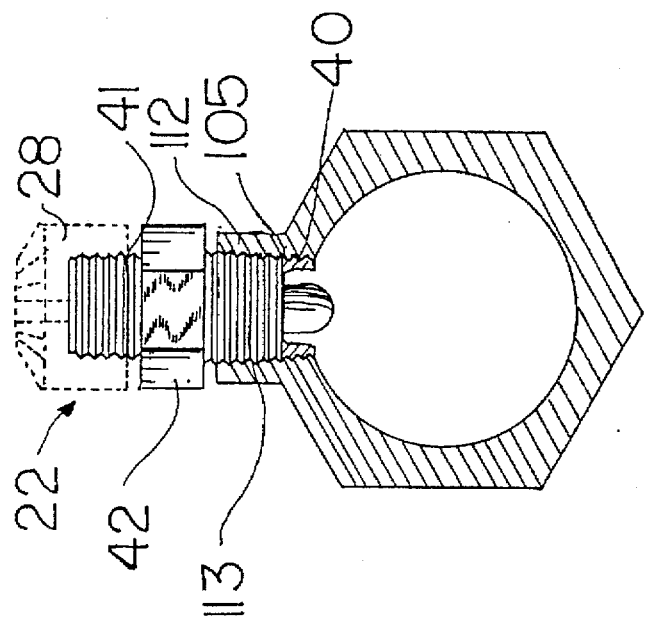
FIG.8B is a cut view according to line 8B—8B of FIG.8A.
Figure 8A:
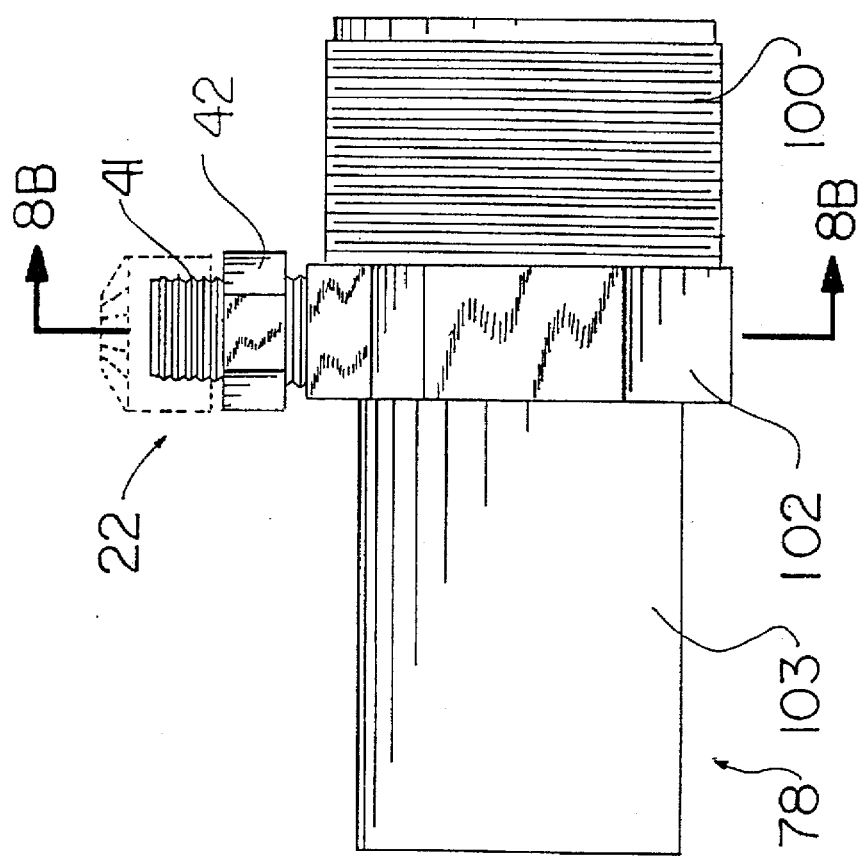
FIG.8A is a side view of a filter joint.

FIG.8A illustrates the fitting joint 78 comprising successively a joint male thread 100, a tightening hexagon 102 and a piping 103 to attach to a flexible pipe 92—FIG.7—. The tightening hexagon 102 comprises a face 105—FIG.8B— perpendicularly pierced and prolonged by a circular opening 112. The circular opening 112 comprises a female thread opening 113 adapted to recceive the male thread for mounting 40 of the adapter 22 and the nut 42.

Figure 8D:
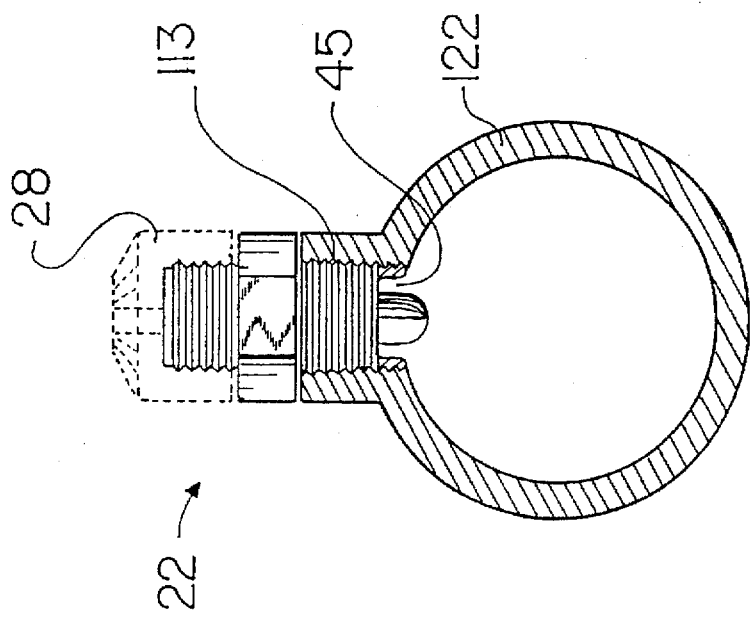
FIG.8D is a cut view according to line 8D—8D of FIG.8C
Figure 8C:
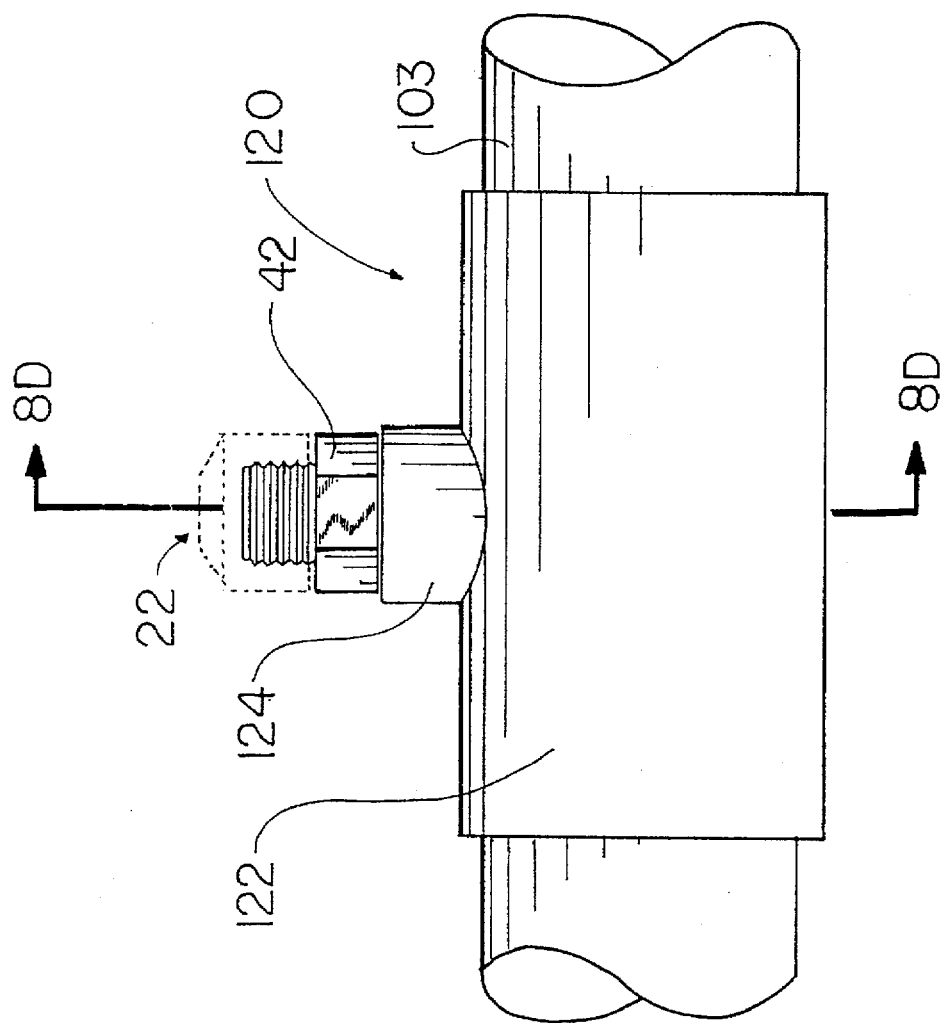
FIG.8C is a side view of a T fitting.

FIG.8C shows a T fitting 120 localized on a water line of a filtration or pumping system of a spa, pool or whirlpool. The T fitting 120 comprises a large diameter pipe 122 with two ends installed along a piping 103 and a small pipe defining a perpendicular entrance 124 comprising a female thread opening 113—FIG.8D—. The circulation channel 45 shows up inside the large diameter pipe 122.

THE FUNCTIONING OF THE INVENTION

The digital reading apparatus 20—FIG.1—is put in place according to four steps:

the first step consists in screwing the closed end 27 of the adapter 22 by means of the male thread for mounting 40 into the drain opening 26, in the place of the drain plug 59—FIG.2—on a fitting 80, 82, 84, 86, 88, 90,—FIG.7—or a T fitting 120—FIG.8C—located on a filtration or pumping system;

the second step is to insert the temperature probe 24 into the adapter 22 through the open end 25 until the contact point 47 touches the interior of the dome 44 and of the three supports 69; the three supports 69 are adapted to prevent contact point 47 from deforming or pulling in the dome 44;

the third step is to insert a transmission wire 30 through the slit 57 in cap 28;

the fourth step is to screw the hexagonal open body 49 of the cap 28, the female cap thread 53 of the male thread for capping 41 onto the open end 25, to adjust the pushing force of the contact point 47 against the interior of the dome 44 and against the supports 69.

The adapter 22 fills two functions. The first function is to serve as receptacle for the temperature probe 24 and to receive the cap which exerts a pressure unto the back end at the probe. The second function is to replace a drain plug, to prevent water loss.

Figure 3B:
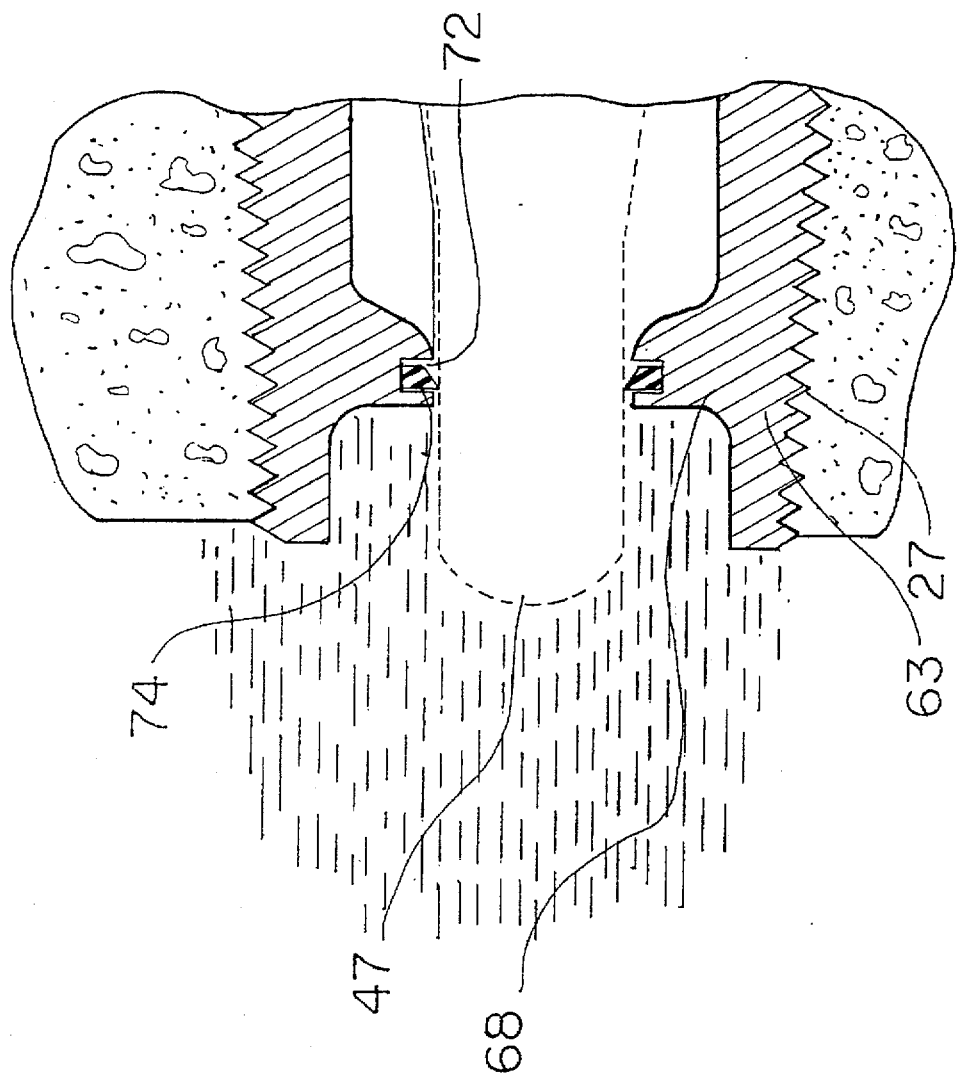
FIG.3B is an alternative of FIG.3A

The function of the dome 44 is to protect the temperature probe 24 against possible degradation caused by water. The dome may be absent and the contact point then replace the dome and rests tightly on a first resilient collar 74 on the restriction area—FIG.3B —, the temperature probe being directly in contact with the liquid. The temperature probe can also be covered with an auto-sealing protective resin that allows tight installation of a probe in contact with the resilient collar 74.

The function of the circulation channel 45 is to permit continuous circulation of a liquid with adequate heat transfer to obtain an accurate reading of the temperature The circulation channel 45 avoids utilization of an elongated probe. In fact the circulation channel 45 is inserted in the drain opening 26. This important characteristic permits the universal installation of an adaptor 22 into pipes without creating any interference with the liquid flow.

Supports 69 allow holding the temperature probe 24 within a limited wall without the contact point 47 deforming or pulling in the dome 44.

The cap 28 fills in four functions. The first function is to assure that the temperature probe 24 is in contact with the dome 44. The second function is to permit a certain adjustment of the assembling length of adapter 22-cap 28 for temperature probes that could be of slightly different lengths. The third function is to give access to the temperature probe 24 without having to remove the transmission wire 30; the fourth function is to prevent the accidental withdrawal of the temperature probe 24 of the adaptor 22.

First means for anchoring are preferably a male thread for mounting 40 adapted to screw the closed end 27 of the adaptor within the drain opening 26.

Second means for anchoring are preferably a male thread for capping 41 to allow to screw the cap 28 to the adaptor and to adjust the contact point against the interior of the dome. The means for pushing comprise preferably a cap of a generally cylindrical shape comprising a female thread and a slit.

It is possible to install the digital reading apparatus 20 in other locations of filtration or pumping systems of a spa, pool or whirlpool. The adapter 22 can be screwed in the circular opening 112 of a fitting joint 78 or in the perpendicular entrance 124 of a T fitting 120. The digital reading apparatus 20 is installed in the fitting joint 78 or the T fitting 120 according to the same steps as for the installation in the drain opening 26.

The preferred installation method comprises the following steps:

free a contact opening in a bath, spa, swimming pool or whirlpool with a filtering or pumping system with drain openings and couplings, joints or T fittings and choose an adaptor with two ends a first closed end and a second open end, the first closed end terminated by a dome and covered on the outside by mounting means such as a first thread of mounting 28, the second end being a second male part, opened;

insert the adaptor with the first male thread for mounting 20 into the contact opening;

insert a temperature measuring probe with a contact point into the adaptor until the contact point touches the dome interior;

insert means for pushing onto the second male part of the adapter to assure enough pressure to provide a good contact between the contact point and the dome: to do so, choose a cap to put in place onto the open end of the adapter, and use second means for anchoring, such as a male thread for capping 41;

provide in the cap a central collar of a small diameter, such as a small ring, a supplementary step consists in inserting the transmission means, such as a wire, inside the cap 28 through a slit 57 so the wire rests inside without detaching the wire, neither from the probe, nor from the numerical reader. The numerical reader 29, joined to the temperature probe 24 by the transmission wire 30, may also be joined by an emitter-receiver 32.

OTHER POSSIBLE EMBODIMENTS

There are other possible embodiments such as one using a modified dome 44 replaced by an auto-forming diaphragm that originates from the restriction area 68 at the base of the dome 44. The dome 44 can be molded unto the adapter 22 and become an independent piece added between the temperature probe 24 and the adapter 22. In another embodiment the dome 44 may be absent: the contact point 47 of the temperature probe 24 replaces the dome 44 and comes directly into contact with water, the restriction area 68 that was the origin of the dome then serves as an air tight collar for the contact point 47. The contact point 47 may be covered with epoxy in order to prevent corrosion. The front part of the probe, dome-shaped, is installed and replaces the dome function. The probe installation comprises the following steps:

replace the drain opening cap of a bath with a fitting device comprising peripheral adaptation means for opening and comprising a restriction area create an annular channel in the restriction area, insert a funnel shaped resilient collar into the annular channel;

insert the temperature probe inside the resilient collar, the walls of the opening forming a cylindrical appendix, the enveloping body of the probe resting tightly against the resilient collar, the space held between the cylindrical appendix and the dome of the probe defining a liquid circulation channel around the dome of the probe.

SPECIAL FEATURES

The dome is preferably shaped from a rigid plastic having a thickness of 0.020 to 0.040 inches and is part of the same adapter.

The reading device further comprises a restricting ring in the restriction area and a resilient collar in cone shape around the restriction ring to insert the temperature probe in the resilient collar, the enveloping body of the probe resting tightly against the resilient collar, the space held between the cylindrical prolongation and the dome probe defining a liquid circulation channel around the dome probe. In the text shapes referred to as cylindrical may be replaced by ring shaped extensions.

It is well understood that the embodiments described above, in reference to the annexed drawings were given under indicative title and nonetheless limitative and that some modifications and adaptations could be brought without departing from the scope of the appended claims:

PARTS LIST

| | |
|---|---|
| 20 | reading apparatus |
| 22 | adapter |
| 24 | temperature probe |
| 25 | open end |
| 26 | drain opening |
| 27 | closed end |
| 28 | cap |
| 29 | numerical reader |
| 30 | transmission wire |
| 32 | emitter-receptor |
| 34 | central body |
| 40 | male thread for mounting |
| 41 | male thread for capping |
| 42 | nut |
| 44 | dome |
| 45 | circulation channel |
| 46 | enveloping body |
| 47 | contact point |
| 49 | hexagonal open body |
| 50 | cyclindrical appendix |
| 51 | large diameter |
| 53 | female cap thread |
| 55 | small ring |
| 57 | slit |
| 59 | drain plug |
| 60 | filter drain |
| 62 | pump drain exit |
| 63 | annular appendix |
| 64 | extremity |
| 66 | hemispherical end |
| 67 | annular extension |
| 68 | restriction area |
| 69 | supports |
| 70 | standard joint fitting |
| 72 | annular channel |
| 74 | resilient collar |
| 77 | swimming pool |
| 78 | fitting joint |
| 80 | skimmer |
| 82 | strainer |
| 84 | exit of a pump |
| 86 | entrance of a filter |
| 88 | exit of a filter |
| 90 | water return |
| 92 | flexible pipe |
| 100 | joint male thread |
| 102 | tightening hexagon |

PARTS LIST -continued

| | |
|---|---|
| 103 | piping |
| 105 | face |
| 112 | circular opening |
| 113 | female thread opening |
| 120 | T fitting |
| 122 | large diameter pipe |
| 124 | perpendicular entrance |

I claim:

1. A fitting device for adapting a liquid temperature probe to a tub with a threaded outlet from outside to inside of said tub, said liquid temperature probe comprising a contact point for probing liquid temperature, an enveloping body and a cable for transmitting data, said fitting device comprising in combination:

an elongated hollow body with first and second ends and a central body (34) with a fore end and an aft end, said first end including a dome to be directed towards said outlet, and further including a ring shaped extension of said central body around said dome, the space between said ring shaped extension and said dome defining a liquid circulation channel, said central body having, from the fore end to the aft end:
first male threads for mounting (40), on said fore end, for adapting to said outlet,
a central external portion comprising means for engaging said first male threads for mounting (40) into said outlet,
threads on the aft end, and
an internal chamber for receiving said enveloping body (46), said first end of said elongated hollow body being a closed end (27) and said second end being an open end (25), said closed end (27) comprising said dome (44) with the convex part oriented opposite to said central part and being adapted for contact with said liquid, said dome (44) receiving said contact point (47) in its concave part, a cap (28) comprising means for progressively engaging said threaded aft end, and simultaneously pushing against said enveloping body.

a slit (57) for permitting the passing through of said cable, so that the passing of said cable through said slit and progressive engaging of said cap along said threaded aft end causes the pushing of said liquid temperature probe into intimate contact with said dome.

2. The device of claim 1 wherein said means for progressively engaging said threaded aft end comprise:

a hexagonal open body (49) for tightening over said threaded aft end, a cylindrical appendix (50) mounted end to end and coaxially with said hexagonal open body (49), said cylindrical appendix (50) adapted for leaning against said enveloping body of said liquid temperature probe (24).

3. The device of claim 1 wherein said means for adapting to said outlet is a hexagonal protrusion localized on said central external portion of said elongated body, at midway between said open end and said closed end, and concentric with said first male threads (40).

4. The device of claim 1 wherein said temperature probe cable is connected to a digital reader.

5. The device of claim 1, wherein said thread aft end comprises male thread for capping (41), and wherein said cap comprises a longitudinal rotation axis, a disk frame perpendicular to said axis and a cylinder originating outwardly from said disk frame, said cylinder having an external polygonal surface and interior female threading for joining said second male threading of said open end, said disk centrally perforated and having a central collar of small diameter.

6. A device as defined in claim 5 wherein said cap comprises a radial opening originating from said longitudinal rotation axis and extending on all of said cap length.

7. The device of claim 1, wherein said closed end (27) includes a restriction area (68) and an annular appendix of said restriction area. said annular appendix 63 located concentrically and outside of said dome (44) and extending towards an extremity (64), the diameter of said dome (44) being much smaller than that of said annular appendix (63), said dome (44) including a hemispherical end (66) installed on an annular extension (67) originating from said restriction area (68), the space defined between said annular appendix, said annular extension (67) and said restriction area (68) defining said liquid circulation channel (45).

8. The device of claim 7 wherein said restriction area includes three tapered supporting ribs spaced 120 degrees from one another and bent towards the outside of said central part of said hollow body.

9. The device of claim 7 wherein said dome is constructed from a rigid plastic having a thickness of 0.020 to 0.040 inches and is part of the same adapter.

10. A device as defined in claim 1 wherein said fitting is a fitting joint comprising a hexagonal tightening outside surface and a circular opening being pierced perpendicularly through one of the faces of said hexagon, said fitting being a T fitting of which the small opening is adapted to receive said probe.

11. An assembling method for adapting a liquid temperature probe onto a drain opening of a filtration or pumping system of a swimming pool, spa or whirlpool, said temperature probe including an enveloping body, wherein a front part includes a temperature sensing element and a back part includes a data transmission cable, said method including the following steps:

- to choose an elongated adapter including two opposed male parts, a first male part carrying a dome axially placed and a channel surrounding said dome, and a second male part adapted to receive axial means for pushing said enveloping body towards said dome:

- to free an opening in said system and to insert said first male part of said adapter;

- to insert said probe into said elongated adapter;

- to choose a cap (28) for displacement along said second male part, said cap including a central collar of small diameter and a radial slit;

- to insert said data transmission cable into said radial slit and through said collar;

- to screw said cap onto said second male part, said central collar pushing onto said enveloping body with sufficient pressure to provide good contact between said contact point and said dome.

* * * * *